Jan. 20, 1959   H. B. SEDGFIELD ET AL   2,869,851
APPARATUS ADAPTED TO MEASURE ACCELERATIONS AND INCLINATIONS
Filed March 22, 1950   2 Sheets-Sheet 1

Inventors
HUGH B. SEDGFIELD.
MARCUS L. JOFEH.
RUDOLF ALBRECHT.
By
Attorney

Jan. 20, 1959 H. B. SEDGFIELD ET AL 2,869,851
APPARATUS ADAPTED TO MEASURE ACCELERATIONS AND INCLINATIONS
Filed March 22, 1950 2 Sheets-Sheet 2

Inventors
HUGH B. SEDGFIELD.
MARCUS L. JOFEH.
RUDOLF ALBRECHT.
By
Herbert H. Thompson
their Attorney.

United States Patent Office 2,869,851
Patented Jan. 20, 1959

2,869,851

APPARATUS ADAPTED TO MEASURE ACCELERATIONS AND INCLINATIONS

Hugh Brougham Sedgfield, London, Marcus Lionel Jofeh, Stonehouse, Gloucester, and Rudolf Albrecht, London, England, assignors to The Sperry Gyroscope Company Limited, Brentford, England, a British company Application March 22, 1950, Serial No. 151,068

Claims priority, application Great Britain March 28, 1949

5 Claims. (Cl. 264—1)

The present invention relates to apparatus adapted to measure accelerations or inclinations of a support or platform on which the apparatus is mounted. Such devices are usually referred to as accelerometers or inclinometers respectively according as they are arranged or intended to respond primarily to accelerations or inclinations of the platform. It is well-known that there is no fundamental distinction between an accelerometer or an inclinometer since either is responsive to the resultant forces acting upon the elements of the apparatus due on the one hand to the acceleration reactions set up in the mass element when the platform is accelerated, and to gravity on the other hand. Generally speaking, an accelerometer or inclinometer is arranged to respond to the resultant of the acceleration and gravitational forces acting on a test-mass element suspended in or from a base or support with freedom to move relatively thereto and in most cases it responds to a component of this resultant force along a direction defined relatively to the base or support owing e. g. to the nature of the suspension of the test-mass in or from the support.

The invention has for one of its objects, the provision of improved apparatus of this kind suitable for use as an accelerometer or an inclinometer.

Hereinafter, whether the apparatus be intended for use as an accelerometer or an inclinometer, we may refer to it simply as an "accelerometer" and similarly, we may refer to the resultant force acting on the test-mass compounded from its weight and its reactions against acceleration simply as the "acceleration force" acting on the test-mass. As has already been mentioned, the apparatus is responsive to a component of this resultant force along a direction defined relatively to the suspension; hereinafter we shall refer to this direction as the "direction of measurement" and the component of the aforesaid resultant force along this direction as the "effective acceleration force" acting on the test-mass. In conformity with this understanding, we may refer to the component of the resultant of the accelerations of the platforms and of gravity reversed, as the "effective acceleration" of the platform. Hereinafter, therefore, the terms "acceleration" and "accelerometer" may have meanings broader than those normally accepted, as fits the context in which they are used.

It has previously been proposed to provide accelerometers and inclinometers in which the test-mass is suspended from a support by means of a spring system in such a manner that when accelerations are imparted to the support, a relative displacement occurs between the mass and the support, and in which means are provided for measuring this relative displacement, the measurement of displacement so obtained being used as a measure of the acceleration. Such devices are suitable where great accuracy is not required, but are not capable of use for measuring accelerations with precision over a range of values of acceleration that is very large compared with the precision required. Among the reasons that contribute towards this lack of precision is the difficulty in realising a spring suspension in which the relative displacement is proportional to the applied force over a wide range of values of force, and in which the zero position of the test-mass when centralised by the suspension system in the absence of externally supplied force is not liable to change owing to secular changes in the materials forming the spring suspension or owing to temperature changes.

It is a particular object of the invention to provide an accelerometer or inclinometer that will operate to produce, in response to an acceleration, a measurable physical quantity the magnitude of which shall be accurately proportional to the magnitude of the effective acceleration over a wide range of values of acceleration so that it shall be possible to measure accelerations accurately by accurately measuring the said physical quantity. An accelerometer or inclinometer having these properties satisfies the requirements of sensitivity to small accelerations yet accuracy over a wide range of accelerations.

The principle upon which the invention is based is the application to the test-mass of a restoring force to urge it to return towards its neutral position, this restoring force being applied by means of a controlling quantity to which this force is accurately proportional and the use of the controlling quantity as the measure of the acceleration.

Accordingly, the invention provides in one of its aspects apparatus for measuring accelerations or inclinations of a movable body, comprising an acceleration-detecting instrument having a support and a test-mass suspended in or from it so as to be capable of moving relatively to it when the body is accelerated, wherein a restoring force proportional to a quantity governing its application is applied to the test-mass, after it has become displaced relatively to the support as a result of acceleration of the support, to urge the mass to return towards its zero position relative to the support, and wherein the governing quantity is used to provide a measure of the acceleration.

In order to enable the restoring force to be applied, a displacement-detector is provided for detecting relative displacement of the test-mass and its support, and for providing an indication or a control quantity external to the instrument according to which the application of the restoring force may be governed.

According to another aspect of the invention there is also provided an acceleration-detecting instrument, for use in the apparatus set out above, comprising a support and a test-mass suspended in or from it so as to be capable of moving relatively thereto when the body is accelerated, a displacement-detector for detecting displacements of the mass away from a zero position with respect to the support, and means for enabling a restoring force to be applied to the mass to urge it back towards its zero position with respect to the support.

The invention in another of its aspects consists in certain improvements in mounting a mass relative to the support suitable for use in an acceleration-detecting instrument of the kind described, the nature of which will become evident from the detailed description which follows, as will also other features and objects of the invention.

In the preferred form of the invention, the application of the restoring force is automatically governed by the displacement-detector. To this end, the displacement-detector is preferably arranged to provide an electrical signal which is electrically amplified, the amplifier being used to control the provision of the governing quantity that applies the restoring force to the test-mass.

The test-mass preferably comprises an electrical coil arranged in the magnetic field provided by a magnet system with freedom to move relatively thereto in such a way that movement of the coil relative to the magnet system is capable of generating an electro-motive force in the coil and conversely, current fed to the coil from an exterior source is capable of causing movement of the coil. The controlling quantity in the form of an electrical signal is generated by the displacement-detector and from this signal there is derived, after electrical amplification, a governing quantity in the form of a direct current whose sign depends upon the direction of the displacement of the test-mass from its normal position of rest and whose magnitude increases with the increase of the displacement from this normal position of rest at least over a small range of such displacement. This governing-quantity current is passed through the coil to provide the required restoring force.

The use of an electrically-derived restoring force removes all the disadvantages of the spring-inertia accelerometers of the prior art wherein the force that limits the relative displacement of the support of the test-mass is derived solely or mainly from the stresses set up in the spring system. Such prior art accelerometers have a small range and are extremely sensitive to ambient temperature differences so that they cannot be used where either very high sensitivity or accuracy of measurements over a wide range of accelerations is required.

In the above specified example accelerations imparted to the support of the test-mass will cause the mass to move with respect to the magnet system. In accordance with the invention, a restoring force is to be applied to the test-mass that is capable of urging it towards its normal position of rest. The displacement-detector above referred to is such that it will generate a control quantity in the form of an electrical signal in response to the displacement of the coil from its normal position of rest, and means are provided for deriving from this signal a governing quantity in the form of a direct current, whose sign depends upon the direction of the displacement and whose magnitude increases with increase of the displacement at least over a small range of such displacement; this current is passed through the coil of the test-mass to provide the necessary restoring force. It is arranged that for a very small deflection of the coil the signal-generator and the circuits responsible for deriving the direct current from it produce a current of such a magnitude that the force exerted on the coil carrying the current by the magnetic field is very many times larger than the return forces set up by the suspension system supporting the test-mass.

In the preferred embodiments, the arrangements for providing the restoring force in the form of a motive current to the test-mass coil or movable element are as follows: The movement of the coil is arranged to generate a small control quantity as an alternating current signal having a phase-rotation that corresponds to the sense of the displacement of the test-mass and having an amplitude proportional to the magnitude of the displacement. This signal is then amplified and passed through a phase-sensitive rectifying circuit to produce a direct-current signal having a sense corresponding to the sense displacement of the test-mass. This direct-current signal is then amplified and fed back to the coil of the test-mass as a governing quantity to urge it back to its normal position of rest. The circuit constants are arranged to be such that the amount of restoring current is substantially equivalent to the original acceleration force.

In carrying out the specific design of this instrument we have found that the servo-stiffness of the complete signal-generator and feed-back circuits must exceed the mechanical stiffness of the suspension arrangements of the coil system by the accuracy desired. For example, the servo stiffness must be 10,000 times the mechanical stiffness of the suspension system to obtain an accuracy of .01%.

In order that the invention in its various forms may be the more readily appreciated, reference will now be made to the accompanying drawings in which.

Figure 1:
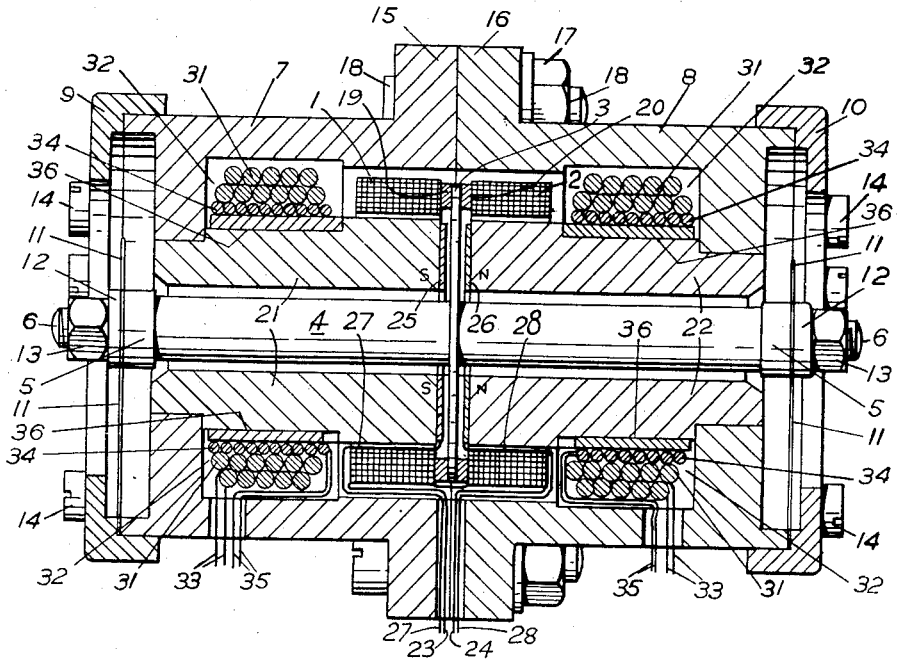
Fig. 1 shows a preferred arrangement of the accelerometer or inclinometer in cross-sectional elevation
Figure 2:
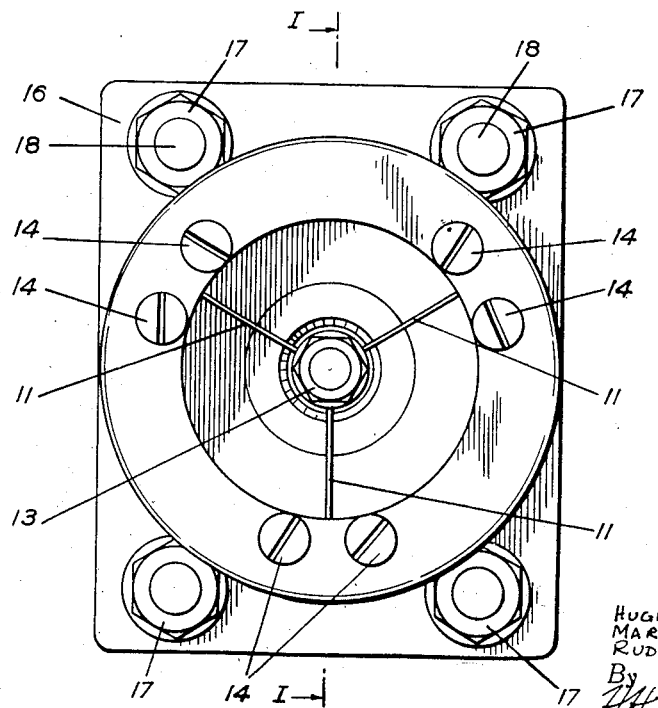
Fig. 2 shows an end view of Fig. 1.

Referring to Fig. 1 which shows a preferred arrangement of the invention when used as an accelerometer or inclinometer, the test-mass comprises a double-annulus coil 1, 2 mounted upon the two opposite sides of a disc 3 that is integral with a concentric shaft 4. At each end the shaft is provided with a shoulder portion 5 and a threaded extension 6. The test-mass is mounted in the support casing, which comprises two medial portions 7 and 8 and two end caps 9 and 10, by means of a resilient suspension made up of filaments 11 that are clamped at their one end between a washer 12 and the shoulder 5 and tightened by means of the nuts 13, and at their other end between the medial portions 7 or 8, as the case may be, and the appropriate end cap 9 or 10. The caps 9 and 10 are secured to the medial portions by screws 14. The two medial portions are flanged at 15 and 16 so that they may be secured together by nuts 17 and bolts 18 in a convenient manner.

The coils 1 and 2 are secured to the disc 3 through the medium of insulating spacing washers 19 and 20 by means of adhesive on the various contacting surfaces.

It will be seen from the above that the test-mass or movable element, suspended by the wires 11, may move axially of the instrument but not appreciably in any other direction.

The coils 1 and 2 are located around a double pot-magnet system 21, 22 magnetised in such a manner as to have opposing portions 21 and 22 of opposite polarity, for example as shown. Leads 23, 24 from the coils are taken through a suitable aperture in the casing. It will be seen that, when no forces of acceleration are applied to the test-mass it will remain at rest centred between the two magnets.

Secured to the poles of the magnets by any suitable means such as an adhesive, are annular plates 25, 26 of quartz having a layer of metal sprayed on their outer faces, that is, on the faces facing towards the disc 3. Leads 27, 28 are secured to the metal surfaces and are led outside the casing through an aperture therein. Suitable channels are cut in the outer surfaces of the magnets 21, 22, as shown, in order to accommodate these leads tidily in their passage towards the aperture. It will thus be seen that the plates 25 and 26 can co-act with the disc 3 to form a differential capacitor, if the disc 3 be suitably connected in circuit therewith. Preferably the disc 3 is earthed or grounded to provide a convenient connection. It is this differential capacitor that acts as the displacement-detector hereinabove referred to.

It is preferable to employ permanent magnets for the magnetic system but it is extremely difficult to assemble an apparatus such as has been described without knocking the magnets and thus de-magnetising them slightly. It is necessary to have a completely reliable magnet system of known strength and electromagnets would be inconvenient. Therefore the magnet system is arranged to be magnetised after assembly into the apparatus. To this end a winding 31, of thick gauge wire to be able to take a heavy magnetising current, is located in the suitably fabricated recess 32. Leads 33 are used to connect the winding to a suitable source of current (not shown). The magnet system may thus be magnetised to a predetermined strength after assembly and the leads 33 may then be disconnected and sealed off. To allow for temperature compensation of the system, compensating windings 34 are provided adjacent the magnets. These are connected by leads 35 to manganin-resistance temperature-compensating network of any known form in order to avoid temperature variations of the system. The windings are insulated from the metal by insulation material 36.

Figure 3:
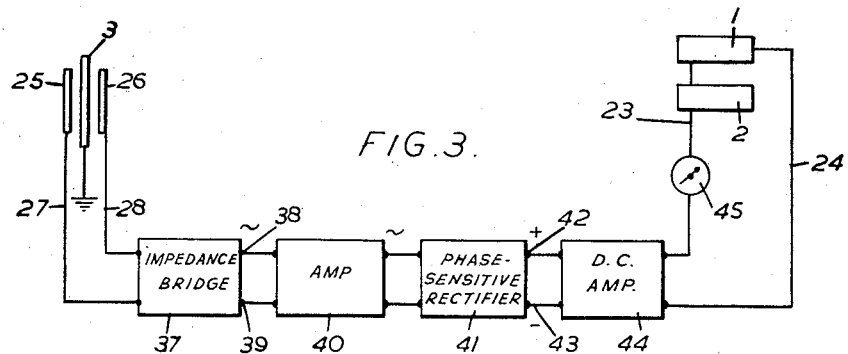
Fig. 3 shows a block diagram of the circuit arrangements utilised for the complete system.

Referring now to the block diagram of Fig. 3, the differential capacitor 25, 3, 26 is connected into and forms part of an impedance bridge 37. When any acceleration forces are imparted to the casing of the apparatus, the test-mass formed by coils 1 and 2, disc 3 and shaft 4, will tend to move, whereby the spacing of the plates of the differential capacitor will vary. As this capacitor forms part of an impedance bridge an alternating-current signal will be produced at terminals 38 and 39 having a phase-rotation dependent upon the sense of movement of the test-mass. This signal is then amplified in the amplifier 40 and fed to a phase-sensitive rectifier 41 to produce a direct-current signal at terminals 42 and 43 arbitrarily shown with plus and minus signs. The sense of this direct current will then arbitrarily indicate the sense of the displacement of the test-mass and its magnitude will be proportional to the acceleration of the mass. This direct current is then amplified in a direct current amplifier 44 and fed back to the coil to urge its return as is described above. The current fed back to the coil may be passed through a suitable meter 45 to give a measure of the accelerations imparted to the system. The meter may be calibrated in gravities.

It will be apparent that the current may be used, if desired, in a control arrangement adapted to reduce or increase the acceleration imparted for maintaining a constant acceleration.

It is to be understood that the invention has been described by way of example only and that various modifications may be made to the specific details hereinbefore described without in any way departing from the scope of the invention.

What is claimed is:

1. An accelerometer comprising an inertia element including an axially extending member having a radially projecting planar component substantially normal to the axis of the axial member and disposed intermediate the ends thereof, and a double-annulus coil having its respective annuli supported upon opposite sides of said planar component, a casing, means for mounting said inertia element within said casing for movement relative thereto along the axis of said axial member, first magnet means having a portion projecting from said casing and extending between said axial member and one of said coil annuli, second magnet means having a portion projecting from said casing and extending between said axial member and the other of said coil annuli, signal generating means for producing a signal dependent on the displacement of said inertia element from a null position along said axis, said signal generating means including a differential capacitor having one plate mounted on the first magnet means and another plate mounted on the second magnet means, said plates being disposed adjacent to and closely spaced from said planar component and substantially parallel thereto, said planar component serving as the common plate of said capacitor, and means including an amplifier connecting said signal generating means in controlling relation to said double-annulus coil, whereby on displacement of the inertia member from the null position thereof, an electromagnetic force derived from the interaction of said coil and said magnet members is exerted on the inertia member to restore said inertia member to its null position.

2. The accelerometer of claim 1 wherein each of said magnet means comprises a core member provided with a coil wound thereabout whereby said magnet means may be magnetized on energization of said coil after assembly.

3. The accelerometer of claim 1 wherein the means connecting the signal generating means in controlling relation to the double-annulus coil further includes an indicating means responsive to the signal fed to said coil, said signal being a measure of the acceleration tending to offset said coil from the null position thereof.

4. An accelerometer comprising an inertia element including an axially extending member having a radially projecting planar component substantially normal to the axis of the axial member and disposed intermediate the ends thereof, and a double-annulus coil having its respective annuli supported upon opposite sides of said planar component, a casing, first resilient means interposed between one end of said axial member and the casing, second resilient means interposed between the other end of said axial member and the casing, said two resilient means serving to suspend said axial member for movement along the axis thereof within said casing, first magnet means including a portion projecting from said casing in a direction substantially parallel to said axis and toward said planar component, second magnet means including a portion projecting from said casing in the opposite direction toward said planar component, a part of one portion extending between said axial member and one of said coil annuli, a part of the other portion extending between said axial member and the other of said coil annuli, signal generating means for producing a signal dependent on the displacement of said inertia element from a null position along said axis, said signal generating means including a differential capacitor having one plate mounted on the first magnet means and another plate mounted on the second magnet means, said plates being adjacent to said planar component and substantially parallel thereto, said planar component serving as the common plate of said capacitor, and means connecting said signal generating means in controlling relation to said double-annulus coil, whereby on displacement of the inertia member from the null position thereof, an electromagnetic force derived from the interaction of said coil and said magnet members is exerted on the inertia member to restore said inertia member to its null position.

5. An accelerometer comprising an inertia element including a shaft having a radially extending disc fixed between the ends of the shaft and concentric therewith, and a double-annulus coil having one annulus supported upon one side of the disc and the other annulus supported upon the opposite side of the disc, said coil being concentric with said shaft, a casing, first resilient means interconnecting one end of the shaft to one end of the casing, second resilient means interconnecting the other end of the shaft to the other end of the casing, said two resilient means serving to suspend said shaft for axial movement within said casing, first magnet means affixed to said one end of the casing, second magnet means affixed to said other end of the casing, each of said two magnet means having a portion thereof concentric to the shaft and disposed between said shaft and the respective annuli of the double-annulus coil, signal generating means for producing a signal dependent on the displacement of said inertia element from a null position along the axis of said shaft, said signal generating means including a differential capacitor having one plate mounted on the first magnet means and another plate mounted on the second magnet means, the disc supporting said coil serving as the common plate of said capacitor, and means including an amplifier connecting said signal generating means in controlling relation to said double-annulus coil, whereby on displacement of the inertia member from the null position thereof, an electromagnetic force derived from the interaction of said coil and said magnet members is exerted on the inertia member to restore said inertia member to its null position.

References Cited in the file of this patent

UNITED STATES PATENTS

| | | | |
|---|---|---|---|
| 1,826,024 | Roller | Oct. 6, 1931 |
| 1,999,215 | Smith | Apr. 30, 1935 |
| 2,067,741 | Weckerly | Jan. 12, 1937 |
| 2,193,707 | Baumann | Mar. 12, 1940 |
| 2,338,147 | Steenen | Jan. 4, 1944 |
| 2,371,040 | Fisher et al. | Mar. 6, 1944 |
| 2,388,537 | Hallstrom | Nov. 6, 1945 |
| 2,445,517 | Dilks | July 20, 1948 |
| 2,445,939 | Meredith | Dec. 14, 1948 |
| 2,475,050 | Purington | July 5, 1949 |
| 2,498,997 | McLean et al. | Feb. 28, 1950 |
| 2,591,921 | Cosgriff | Apr. 8, 1952 |